United States Patent

[11] 3,597,079

[72] Inventor John Gioacchino Celi
 Reading, Mass.
[21] Appl. No. 709,079
[22] Filed Feb. 28, 1968
[45] Patented Aug. 3, 1971
[73] Assignee Itek Corporation
 Lexington, Mass.

[54] IMAGE ENHANCEMENT APPARATUS AND METHOD USING A RADIANT SURFACE WHICH PRODUCES FREE HOLES AND ELECTRONS UPON EXCITEMENT
24 Claims, 6 Drawing Figs.

[52] U.S. Cl.............................................. 355/80,
 96/27, 355/110, 355/111
[51] Int. Cl.................................................. G03b 27/76
[50] Field of Search............................................ 355/80,
 104, 108, 110, 111; 96/27

[56] References Cited
UNITED STATES PATENTS
3,166,998 1/1965 Watson........................ 355/80

FOREIGN PATENTS
669,879 9/1963 Canada........................ 355/80

Primary Examiner—Samuel S. Matthews
Assistant Examiner—Richard L. Moses
Attorneys—Homer O. Blair, Robert L. Nathans, Lester S. Grodberg and Joseph S. Iandiorio ABSTRACT: Apparatus is disclosed for enhancing photographic images during printing which comprises an infrared light source, an ultraviolet light source, and a thermoluminescent surface. Enhancement is accomplished by exciting the thermoluminescent surface with ultraviolet light to generate holes and electrons therein and subsequently passing infrared light through a negative transparency and onto the excited thermoluminescent surface. The infrared light stimulates the thermoluminescent surface to emit actinic light which passes back through the negative and exposes a photosensitive print medium. The negative transparency provides attenuation of both the infrared radiation and the actinic light in direct proportion to the density of the transparency thereby enhancing the contrast of the photographic image in the print.

JOHN G. CELI
INVENTOR.

BY Joseph S. Iandiorio

ATTORNEY.

JOHN G. CELI
INVENTOR.

BY Joseph S. Iandiorio

ATTORNEY.

IMAGE ENHANCEMENT APPARATUS AND METHOD USING A RADIANT SURFACE WHICH PRODUCES FREE HOLES AND ELECTRONS UPON EXCITEMENT

CHARACTERIZATION OF INVENTION

The invention is characterized in apparatus for enhancing a photographic image during printing by increasing the contrast of underexposed areas of the image, including a radiant surface, a first energy source for exciting the radiant surface with radiation in a first frequency range to produce free electrons and holes in the surface, and a second energy source for directing radiation in a second frequency range through an image-bearing transparency onto the excited surface to produce a high rate of recombination of holes and electrons to produce radiation in a third frequency range from the surface in the form of the image, the radiation in a third frequency range being simultaneously directed to expose a photosensitive medium responsive to the radiation in a third frequency range to form a record of the image, the transparency providing attenuation of the radiation in the second frequency range directed toward the surface and of the radiation in the third frequency range emitted from the surface in direct proportion to the density of the transparency.

BACKGROUND OF INVENTION

This invention relates to image enhancement in photographic reproductions and, more particularly, to means for increasing contrast of underexposed or shadow areas of photographic images.

In many cases important information is derivable from the underexposed or shadow areas of images obtained from aerial photographs, but is lost because of the poor contrast available at low exposure levels of the film. These underexposed or shadow areas which appear as dark areas on the positive photograph and in the originally photographed scene, appear as light or low density areas on the negative film. The lighter or less dense areas of the negative lie on a nonlinear portion of the characteristic curve of the film. The characteristic curve is a plot of density vs. logarithm of exposure (D/logE) where the density is the ordinate and the log of the exposure the abscissa. Both the density and log of exposure increase as distance from the origin increases in such a plot, but for the first part of that curve the density does not increase linearly compared to the log exposure value, and in the initial stages of that first part, where exposure is low, only small differences in density are observable for relatively substantial differences in exposure. The result is that information in this area is usually indiscernible because of the lack of contrast.

The information in the underexposed, low density areas of a negative could be extracted in a limited sense by supplying an abundance of light which would sufficiently expose those areas on the photosensitive medium being printed but this technique might overexpose the information in the already sufficiently exposed area. And even so, with this technique the contrast in the low exposure areas is not effectively increased. Special masks and exposure control devices also could be used to improve the contrast of underexposed areas but would be an added expense and would substantially increase the time required to produce the desired result.

SUMMARY OF INVENTION

Thus it is desirable to have available means for increasing the contrast of images in underexposed areas of photographic film.

It is also desirable to provide means for increasing the amount of print exposing radiation passing through low density areas of negative film and decreasing the amount through high density areas of negative film during printing to increase the contrast of images recorded thereon.

It is also desirable to provide such means for accomplishing this end quickly, efficiently, inexpensively, and in one operation, without need for special masks or exposure control devices.

It is also desirable to provide such means for enhancing the contrast of images in underexposed areas of successive segments of film during continuous, successive printing of the film segments.

It is also desirable to provide means for enlarging and minifying the sizes of images being printed while the contrast of the images in underexposed areas of the film is being enhanced.

The invention may be accomplished by a first energy source for exciting a radiant surface with radiation in a first frequency range to produce free electrons at the surface and a second energy source for directing radiation in a second frequency range through an image-bearing transparency onto the excited surface to produce a high rate of recombination of holes and electrons to produce radiation in a third frequency range from the surface in the form of an image. The radiation in the third frequency range is simultaneously directed to expose a photosensitive medium responsive to the radiation in the third frequency range to form a record of the image. The transparency attenuates the radiation in the second frequency range directed toward the surface and the radiation in the third frequency range emitted from the surface in direct proportion to the density of the transparency.

DISCLOSURE OF SPECIFIC EMBODIMENT

Other objects, features, and advantages will appear from the following description of a preferred embodiment of the invention, taken with the attached drawings, in which.

Figure 1:
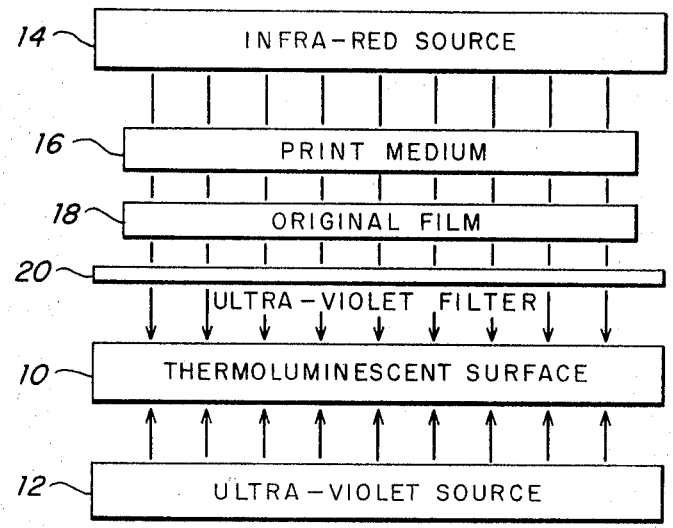
FIG. 1 is a diagram of an apparatus according to this invention.

There is shown in FIG. 1 an apparatus for enhancing photographic images including a radiant surface 10 which can be a thermoluminescent surface formed from materials such as lithium fluoride or potassium chloride. Such a thermoluminescent surface can be excited, for example, by radiation from a first energy source 12 which can be an ultraviolet light source as shown in FIG. 1 or an X-ray source, to produce free electrons and holes in the thermoluminescent surface. The electrons and holes begin recombining as soon as they are produced but the energy supplied by first energy source 12 is such that the recombination takes place at a very low rate and little or no actinic light is emitted from surface 10 under these conditions.

When surface 10 is subjected to sufficient radiation in a second frequency range produced by a second energy source 14, the recombination of holes and electrons attains a rate at which sufficient actinic light is emitted from surface 10 for exposure and photographic printing. FIG. 1 illustrates that suitable radiation in a second frequency range can be supplied in the form of infrared radiation by infrared source 14, but other sources of energy are suitable as well.

Image enhancement is accomplished in the specific embodiment by directing infrared radiation through the print medium 16, which acts only as a neutral filter to this radiation, then through the negative transparency 18 of the original film onto thermoluminescent surface 10. However, all portions of surface 10 do not receive the same amounts of infrared energy and the emission of actinic light therefrom is not uniform because the infrared radiation is attenuated in accordance with the negative image on negative transparency 18. The more dense, well exposed areas of negative transparency 18, corresponding to the less dense, underexposed areas of the positive image to be reproduced on medium 16, substantially attenuate the infrared radiation passing through them and therefore substantially decrease the amount of infrared radiation incident on corresponding portions of surface 10. This results in a lower recombination rate of the electrons and holes and lower emission of actinic light from those portions of surface 10. As it is directed back to expose medium 16, the actinic light emitted from these portions of surface 10 is also attenuated by the underexposed, more dense areas of negative transparency 18, so that the illumination of well exposed, less dense portions of the positive image to be reproduced on medium 16 is twice reduced to a substantial degree by corresponding areas of negative transparency 18.

In comparison, the less dense, underexposed areas of negative transparency 18, corresponding to the more dense areas of the positive image to be reproduced on medium 16, attenuate to a lesser degree the infrared radiation passing through them and therefore decrease only slightly the amount of infrared radiation incident on corresponding portions of surface 10. This results in a substantially higher recombination rate of holes and electrons and higher emission of actinic light from those portions of surface 10. As it is directed back to expose medium 16, the actinic light emitted from these portions of surface 10 is only slightly attenuated by the less dense areas of negative transparency 18, so that illumination of more dense portions of the positive image to be reproduced on medium 16 is doubly reduced by the corresponding areas of negative transparency 18 but not to the same degree as the illumination passing through the high density area of the negative. Thus, while more light has been produced through less dense, underexposed areas of negative transparency 18 to expose corresponding more dense, overexposed areas of the photographic image and reveal more information in those underexposed areas by exaggerating the contrast, less light has been produced through more dense areas of transparency 18 and the relative contrast has been significantly increased.

Figure 4:
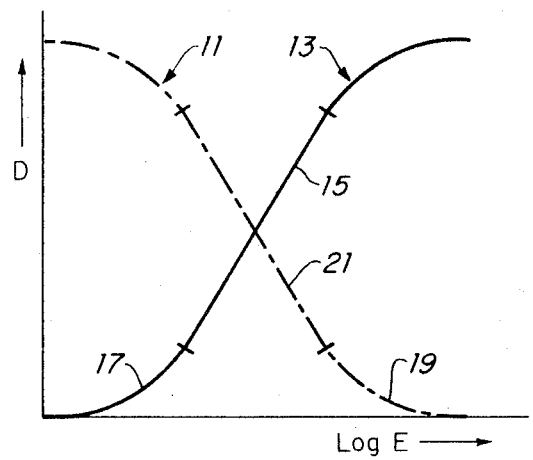
FIG. 4 is a graph of typical density (D) vs. logarithm of exposure (logE) curves for positive and negative film.

The principle implemented by the structure in FIG. 1 may be better understood by reference to FIG. 4 showing D/LogE curves 11, 13 for both positive and negative film, respectively. When the original negative film is exposed to light from a scene to be photographed, a negative image of the scene is produced on that original negative film such that dark areas of the scene appear as low density areas on the negative and bright areas of the scene appear as high density areas on the negative. Generally, exposure conditions and film are chosen so that major portion of the photographing takes place in the substantially linear central region 15 of the negative characteristic 13. However, areas of the scene which radiate little light cause the original film to respond in the nonlinear, low contrast, toe region 17 of characteristic curve 13. When being used in the toe region 17, the film not only responds non-linearly to the logarithm of the exposure but also shows relatively insignificant changes in density for significant changes in the logarithm of the exposure. The result is a final positive print in which all objects below a particular exposure level but at different exposure levels, are indistinguishable because of the lack of contrast. Of course, as was stated previously, limited improvement can be had by forcing a high value of light exposure through the negative so that the final positive print is a much brighter print. However, the relative contrasts are not substantially improved and the image is not enhanced.

The present invention by using the negative to control the amount of exposing light produced and the amount of the exposing light to which the positive medium is exposed, accentuates the small differences within underexposed, high density areas of the negative having exposure levels in toe region 17. In addition, the underexposed areas of the original scene appear as low density areas on the negative and therefore greater amounts of light pass through underexposed areas of the negative than pass through well exposed areas of the negative. Thus, underexposed, low density areas of the negative film are printed onto the positive film at a high exposure level above toe region 17 of positive characteristic 19 and within the central linear region 21. And well exposed, high density areas of the negative film are printed onto the positive film at low exposure in the linear region 21 and sometimes even in the toe region. The result is that the underexposed, low density areas of the original negative film are exposed at a high exposure level which amplifies or enhances any distinctions in contrast and by virtue of that high exposure level the positive film responds within the central linear region 21 of positive characteristic 13, where best contrast is obtainable.

The final print created by this invention has improved and more uniform contrast, for the underexposed, poor contrast areas of the original negative film receive more exposure to accentuate contrast and provide exposure at a level within the linear response region of the positive film while well exposed areas of the original negative film which already possess good contrast as a result of exposure in the central, linear region of the negative characteristic are provided with lower exposure levels. This deprivation to the well exposed areas does not sacrifice contrast to a great extent because generally these well exposed, high density areas of the negative have sufficient definition and contrast to withstand the lower exposure levels and still deliver a good quality print on the positive film.

Of course while this specific embodiment is explained in terms of negative film and positive film, the invention is not limited to that combination. The original may be a positive and the final print a negative according to this invention. The invention is not limited to use with an exciting source of ultraviolet light, an infrared source for stimulating the exposure light, and actinic light for exposing the film. Many types of radiant energy may be used to produce the effect of the invention. The terms "transparent" and "transparency" as used in this application refer to materials which are transparent to various types of radiation, not just those transparent to visible light. For example, certain types of transparencies may be used which have very low transmittance in the visible light range but significant transmittance in the infrared, X-ray, or ultraviolet ranges. The terms "photograph," "photographic," and "photography" are used herein in their broadest sense, i.e. the art of process of producing images on a sensitized surface by the action of light or other radiant energy.

THe print medium 16 and infrared source 14 are selected to insure that the frequency of the infrared radiation is not in the sensitive range of the print medium 16 in order to prevent exposure of the medium by the infrared radiation. And ultraviolet filter 20 between surface 10 and negative transparency 18 prevent s exposure of medium 16 by any ultraviolet radiation which may pass through surface 10.

Figure 2:
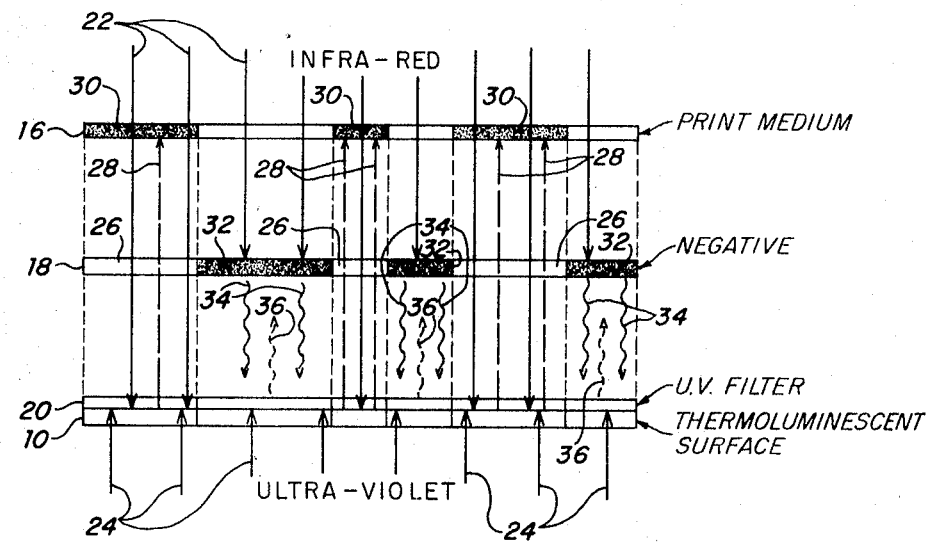
FIG. 2 is a schematic of the light and energy attenuation patterns generated by the apparatus of FIG. 1.

The pattern of interaction of the infrared radiation, ultraviolet radiation and actinic light is shown in FIG. 2. The infrared radiation, indicated by arrows 22, passes uniformly, and substantially unattenuated through print medium 16. The ultraviolet radiation, indicated by arrows 24, is directed uniformly onto the thermoluminescent surface 10 exciting it and producing holes and electrons therein. Further propagation of the ultraviolet radiation is prevented by filter 20. The actinic light being produced by surface 10 by the recombination of the holes and electrons is at a very low level and may be only barely visible, if at all.

After passing through medium 16, the infrared radiation 22 encounters negative transparency 18. Those portions of radiation 22 encountering underexposed, low density areas 26 of negative transparency 18, pass through it substantially unattenuated and impinge on corresponding portions of surface 10 causing high rates of hole-electron recombination, resulting in strong actinic light 28 being emitted and directed back through the same areas of transparency 18 to expose low density, underexposed areas 26 of transparency 18 onto areas 30 of the print medium 16.

Those portions of radiation 22 encountering high density, well exposed areas 32 of negative transparency 18, pass through it substantially attenuated and provide only weak energy, arrows 34, to corresponding portions of surface 10. These corresponding portions of surface 10 therefore provide weak actinic light, arrows 36, which is highly attenuated by the high density well exposed areas 32 of negative transparency 18 before it finally reaches medium 16.

Figure 3:
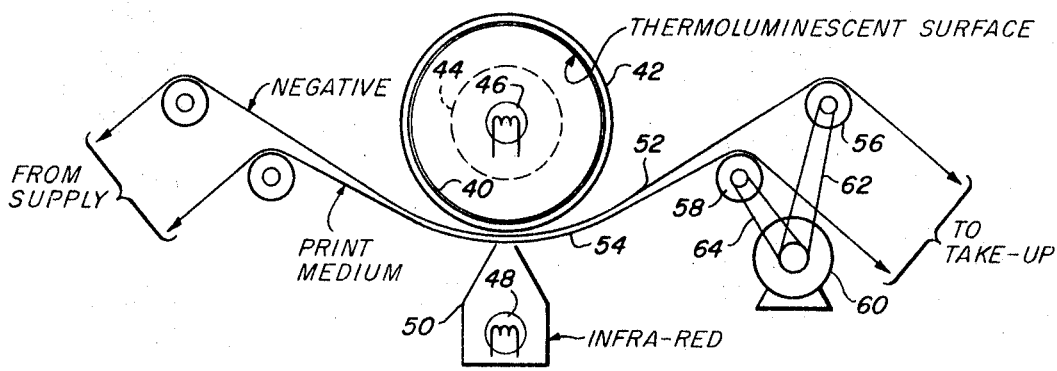
FIG. 3 is a diagram of an apparatus for continuously processing film according to this invention.

The invention may also be applied to processes ans apparatus for enhancing images in continuous photographing printing operations as shown in FIG. 3, where a thermoluminescent surface 40 is disposed about the inner wall of a transparent cylinder 42, rotatable by motor 44. The exciting source may be an ultraviolet source 46 disposed within cylinder 42 to uniformly excite the entire surface 40. Infrared source 48, preferably contained in a housing 50, projects the infrared radiation onto surface 40 in a narrow zone. Ultraviolet source 46 may also be contained in a housing which projects a narrow zone of energy onto surface 40. Cylinder 42 may have associated with it, or may itself incorporate, ultraviolet filtering means. One of he infrared or ultraviolet sources may be within the cylinder and the other may be external to it; it is preferred to have the infrared source, which generates more heat, outside of the drum where temperature control is more easily accomplished.

THe narrow zone of energy projected at surface 40 by infrared source 48 extends across surface 40 and is moved along surface 40 by the relative motion between surface 40 and infrared source 48 caused by the motion of cylinder 42 which constantly sweeps successive portions of surface 40 past the infrared source 48. In this structure surface 40 is moved relative to source 48, but source 48 may as well be moved relative to surface 40. It is preferable to keep the narrow zone of energy sweeping across surface 40, so that any residual actinic light patterns on a particular narrow portion of surface 40 resulting from the persistence of the surface has time to decay during the interval between that portion's recurring exposures to the narrow zone of energy.

Since, in the apparatus of FIG. 3, the narrow zone of energy, thus the actinic light emitted from narrow portions of surface 40, is always present at the same location proximate housing 50, the negative transparency 52 and print medium 54 may be fed about cylinder 42 and through the emitted actinic light for continuous image enhancing during continuous printing of filmstrips or series of independent negatives. In this manner, unexposed narrow sections of the medium 54 and corresponding narrow segments of transparency 52 are successively subjected to exposure by the emitted actinic light controlled by the interaction of the infrared radiation and ultraviolet radiation in a continuous operation in which printing and image enhancement are simultaneously effected.

Either the transparency and print medium combination or the narrow zone of energy from source 48 may be moved relative to the other. In the structure of FIG. 3, the transparency and print medium combination are moved relative to the narrow zone of energy by means of drive rollers 56 and 58, both of which are driven by motor 60 through belts 62, and 64, respectively.

Members of various geometric shapes may be used instead of cylinder 42: an endless belt could be used, or a planar surface may be used with an arrangement for a recycling period initiated when the narrow zone of energy and the actinic light emitted from narrow portions of surface 40 occur at a terminal part of the surface.

Figure 5:
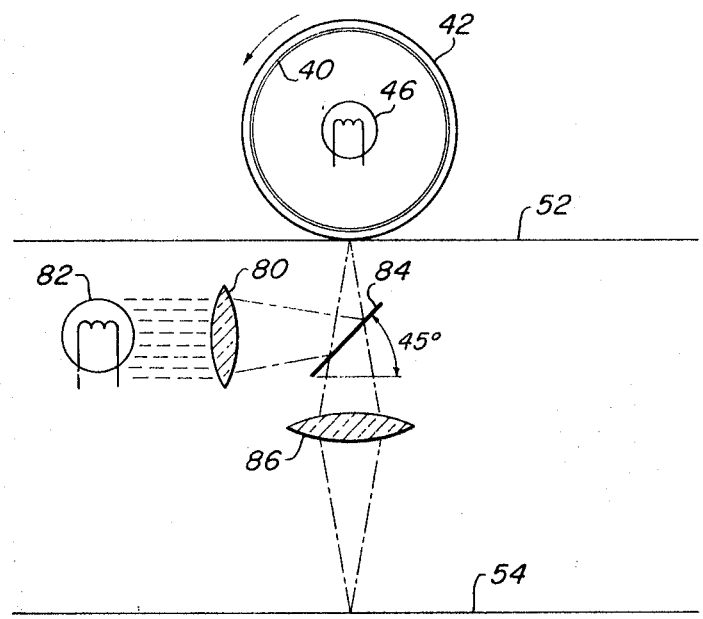
FIG. 5 is a schematic illustration of a structure similar to that of FIG. 3 including enlarging and minifying apparatus.

Apparatus for enlarging or minifying the image on the negative as it is being enhanced and printed may be included in either of the embodiments in FIGS. 2 and 3. Such apparatus is shown in FIG. 5 as it might be included with the apparatus of FIG. 3. A lens 80 focuses the radiation from infrared source 82 onto surface 40 of cylinder 42 through negative 52 by means of beamsplitter 84 which is designed to reflect infrared radiation incident at 45° and transmit actinic light incident at 45°. Actinic light from surface 40 passes through negative 52 and beamsplitter 84 to lens 86 which increases or decreases the size of the image and projects it onto positive 54.

Figure 6:
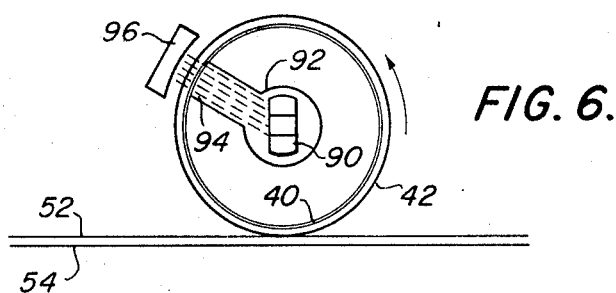
FIG. 6 is a schematic illustration of a structure similar to that of FIG. 3 utilizing an X-ray excitation source in place of the ultraviolet excitation source.

As was stated previously many different types of radiation may be used in place of infrared, ultraviolet and actinic light. In FIG. 6 an X-ray source, tube 90 is substituted for ultraviolet source 46 in FIG. 3. To prevent the highly penetrative X-ray radiation from affecting the negative or positive the X-RAY tube 90 is surrounded in cylinder 42 by shield 92 which excites narrow portions of surface 40 as they pass the open end 94 of shield 92 directed away from negative 52 and print medium 54. A second shield 96 may be provided to absorb any X-ray radiation which passes through surface 40 and cylinder 42.

Other embodiments will occur to those skilled in the art and are within the following claims:

What I claim is:

1. Apparatus for enhancing a photographic image during printing by increasing the contrast of underexposed areas of the image comprising:
    a. a radiant surface which produces free electrons and holes therein upon being excited by radiation in a first frequency range, said free electrons and holes having a high rate of recombination when said surface is struck by radiation in a second frequency range to produce radiation in a third frequency range;
    b. a first energy source for exciting said radiant surface with radiation in a first frequency range to produce free electrons and holes in said surface; and,
    c. a second energy source for supplying radiation in a second frequency range through an image-bearing transparency onto the excited radiant surface to produce a high rate of recombination of holes and electrons to produce radiation in a third frequency range from said surface in the form of a said image, said radiation in a third frequency range being simultaneously directed to expose a photosensitive medium responsive to said radiation in a third frequency range to form a record of said image, said transparency providing attenuation of said radiation in the second frequency range directed towards said surface and of said radiation in the third frequency range emitted from said surface in direct proportion to the density of said transparency.

2. The apparatus of claim 1 in which said radiant surface is luminescent surface.

3. The apparatus of claim 2 in which said radiant surface is a thermoluminescent surface.

4. The apparatus of claim 3 in which said first energy source includes a source of ultraviolet radiation and said radiation in said first frequency range includes ultraviolet radiation.

5. The apparatus of claim 4 in which said second energy source includes a source of infrared radiation and said radiation in said second frequency range includes infrared radiation.

6. The apparatus of claim 5 in which said radiation in the third frequency range includes actinic light.

7. The apparatus of claim 6 in which said transparency is a negative of an original scene and said photosensitive medium becomes the positive.

8. The apparatus of claim 7 in which said second energy source provides a narrow zone of radiant energy in the second frequency range at said surface and there is further included:
    drive means for moving said second energy source and said radiant surface relative to each other to sweep said narrow zone of radiant energy in the second frequency range along said radiant surface to successively encounter narrow portions of said surface, said narrow zone extending transverse to the direction of relative motion of said surface and second energy source; and,
    second drive means for moving said transparency and medium and said narrow zone of energy relative to each other for continuously, successively subjecting sections of said medium and companion segments of said transparency to exposure to said radiation in said second frequency range.

9. The apparatus of claim 8 in which said drive means move said radiant surface relative to said second energy source.

10. The apparatus of claim 9 in which said radiant surface is located on the inner wall of a cylindrical member.

11. The apparatus of claim 10 in which said first energy source is within said cylindrical member and said second energy source is external to it.

12. The apparatus of claim 8 in which said second drive means moves said transparency and medium relative to said narrow zone of energy.

13. The apparatus of claim 1 further including image modifying means for altering the size of the image projected from said transparency to said photosensitive medium.

14. The apparatus of claim 13 in which said image modifying means includes first lens means and means for directing radiation in the second frequency range to said surface.

15. The apparatus of claim 14 in which said means for directing includes second lens means and beamsplitter means for simultaneously directing radiation in the second frequency range to said surface and radiation in the third frequency range away from said surface.

16. The apparatus of claim 7 further including an ultraviolet filter to prevent ultraviolet radiation from reaching said photosensitive medium.

17. The apparatus of claim 16 in which said infrared radiation produced by said infrared radiation source is in the range to which the photosensitive medium is insensitive and in which the medium acts as a neutral filter.

18. A method of enhancing photographic images during printing by increasing the contrast of underexposed areas of a photographic image comprising:
    directing radiation in a first frequency range to excite a radiant surface to produce free electrons and holes in said surface; and
    directing radiation in a second frequency range through an image-bearing transparency onto said excited surface to produce a high rate of recombination of holes and electrons to produce radiation in a third frequency range from said surface in the form of said image, said radiation in a third frequency range being simultaneously directed to expose a photosensitive medium, responsive to said radiation in a third frequency range, to form a record of said image, said transparency providing attenuation of said radiation in the second frequency range directed toward said surface, and of said radiation in the third frequency range emitted from said surface in direct proportion to the density of said transparency and in inverse proportion to the density of the image to be printed on said medium, thereby enhancing the contrast and detail in the underexposed portions of the image borne by said transparency.

19. The method of claim 18 in which said radiation in a first frequency range directed to excite said radiant surface is ultraviolet radiation.

20. The method of claim 18 in which said radiation in a second frequency range is infrared radiation.

21. The method of claim 18 in which said radiation in a second frequency range is directed in a narrow zone of energy onto a narrow portion of said surface, and further including:
    moving said narrow zone of energy and said radiant surface relative to each other to sweep said narrow zone of energy, which extends transverse to the direction of relative motion of said narrow zone of energy and said surface, along said surface to successively encounter narrow portions of said surface; and
    moving said narrow zone of energy and said transparency and medium relative to each other for continuously subjecting sections of the medium and companion segments of the transparency to exposure to said radiation in a second frequency range.

22. The method of claim 21 in which said surface is moved relative to the narrow zone of energy.

23. The method of claim 21 in which said surface is located on the inner wall of a cylindrical member.

24. The method of claim 21 in which said transparency and medium are moved relative to said narrow zone of energy.